`US009978018B2`

(12) United States Patent
Johnson et al.

(10) Patent No.: US 9,978,018 B2
(45) Date of Patent: May 22, 2018

(54) METHOD AND SYSTEM FOR OPTIMIZING EXECUTION OF USER COMMANDS IN RELATION TO POWER MANAGEMENT

(71) Applicant: Aeris Communications, Inc., Santa Clara, CA (US)

(72) Inventors: Drew S. Johnson, San Jose, CA (US); George Edward L. Schaefer, Jr., Tulsa, OK (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 191 days.

(21) Appl. No.: 14/693,757

(22) Filed: Apr. 22, 2015

(65) Prior Publication Data

US 2016/0315998 A1    Oct. 27, 2016

(51) Int. Cl.
| | | |
|---|---|---|
| G06F 15/16 | (2006.01) | |
| G06N 5/04 | (2006.01) | |
| H04L 29/08 | (2006.01) | |
| G06F 1/00 | (2006.01) | |
| H04W 4/18 | (2009.01) | |
| H04W 52/02 | (2009.01) | |

(52) U.S. Cl.
CPC ............. *G06N 5/04* (2013.01); *G06F 1/00* (2013.01); *H04L 67/125* (2013.01); *H04L 67/22* (2013.01); *H04W 4/18* (2013.01); *H04W 52/0258* (2013.01); *Y02B 60/50* (2013.01)

(58) Field of Classification Search
CPC ......... G06F 1/00; H04L 67/22; H04L 67/125; H04W 4/18; H04W 52/0258; G06N 5/04; Y02B 60/50
See application file for complete search history.

(56) References Cited

U.S. PATENT DOCUMENTS

| | | | |
|---|---|---|---|
| 6,330,676 B1 | 12/2001 | Kelsey | |
| 8,316,020 B1* | 11/2012 | Kleinmann | G06Q 30/02 707/734 |
| 2006/0025962 A1 | 11/2006 | Ranganathan et al. | |
| 2009/0254909 A1 | 10/2009 | Hanson et al. | |
| 2011/0153108 A1* | 6/2011 | Yoon | G06Q 50/06 700/295 |
| 2011/0185356 A1 | 7/2011 | Shetty et al. | |
| 2012/0260112 A1* | 10/2012 | Kashyap | G06F 1/3206 713/320 |
| 2012/0323368 A1* | 12/2012 | White, III | G05B 15/02 700/275 |
| 2013/0107727 A1* | 5/2013 | Lunden | H04W 52/0216 370/252 |
| 2013/0210481 A1* | 8/2013 | Sane | H04W 48/18 455/552.1 |
| 2013/0318521 A1 | 11/2013 | Ranganathan et al. | |

(Continued)

OTHER PUBLICATIONS

International Search Report dated Apr. 22, 2016.

*Primary Examiner* — Mohamed A Wasel
(74) *Attorney, Agent, or Firm* — Brundidge & Stanger, P.C.

(57) ABSTRACT

A computer-implemented method and system for optimizing user experience are disclosed. The method and system include determining a power profile of a device; determining historical behavior of at least one user and using a criterion based on the power profile of the device for checking the historical behavior of the at least one user for establishing a connection.

28 Claims, 5 Drawing Sheets

(56) References Cited

U.S. PATENT DOCUMENTS

| | | | |
|---|---|---|---|
| 2015/0215816 A1* | 7/2015 | Abou-Elkheir | H04N 21/25866 |
| | | | 370/230 |
| 2016/0080520 A1* | 3/2016 | Wang | H04L 67/303 |
| | | | 709/204 |
| 2016/0262108 A1* | 9/2016 | Weast | G06F 1/26 |
| 2016/0291671 A1* | 10/2016 | Rider | H02J 13/0006 |

* cited by examiner

METHOD AND SYSTEM FOR OPTIMIZING EXECUTION OF USER COMMANDS IN RELATION TO POWER MANAGEMENT

FIELD OF THE INVENTION

The present invention relates generally to wireless services and more particularly to devices enabled for connectivity to cellular or other wireless service and service optimization for execution of user commands in relation to management of usage of power and communications resources by such devices.

BACKGROUND

Many devices may be controlled or operated through instructions delivered wirelessly by remote devices. When a "target" device is in a low power state and not actively connected to communications networks to save energy or battery and reduce usage of communications resources, there is often a significant delay between the issuance of a command from the remote device and execution of the command.

Accordingly, it is desired to provide a method and system for optimization of approaches for establishing communications between remote and target devices that balance the user's desire for rapid execution of user instructions with effective management of power and communications resources by the target devices.

SUMMARY OF THE INVENTION

A computer-implemented method and system for optimizing user experience in relation to effective management of power and communication resources are disclosed.

In a first aspect, the computer-implemented method comprises determining a power profile of a device, determining historical behavior of at least one user and using a criterion based on power profile for checking the historical behavior of the at least one user. The criterion is used for selecting at least one of a plurality of approaches for establishing communications with the device wherein (1): if the determined power profile is a first predetermined profile, the device establishes a connection for receiving commands when the at least one user initiates a remote application to issue a command to the device but before the command is issued; (2) if the determined power profile is a second predetermined profile, the device establishes a connection for receiving commands based on the historical behavior of the at least one user; and (3) if the determined power profile of the device is a third predetermined profile, the device establishes a connection for receiving commands only when the at least one user issues a command.

In a second aspect, the computer-implemented system comprises a processor and a memory in communication with the processor wherein the memory contains program instructions which, when executed by the processor, perform operations which include determining a power profile of a device; determining historical behavior of at least one user; and using a criterion based on power profile for checking the historical behavior of the at least one user. The criterion is used for selecting at least one of a plurality of approaches for establishing communications with the device wherein (1): if the determined power profile is a first predetermined profile, the device establishes a connection for receiving commands when the at least one user initiates a remote application to issue a command to the device but before the command is issued; (2) if the determined power profile is a second predetermined profile, the device establishes a connection for receiving commands based on the historical behavior of the at least one user; and (3) if the determined power profile of the device is a third predetermined profile, the device establishes a connection for receiving commands only when the at least one user issues a command.

DETAILED DESCRIPTION

Figure 1:
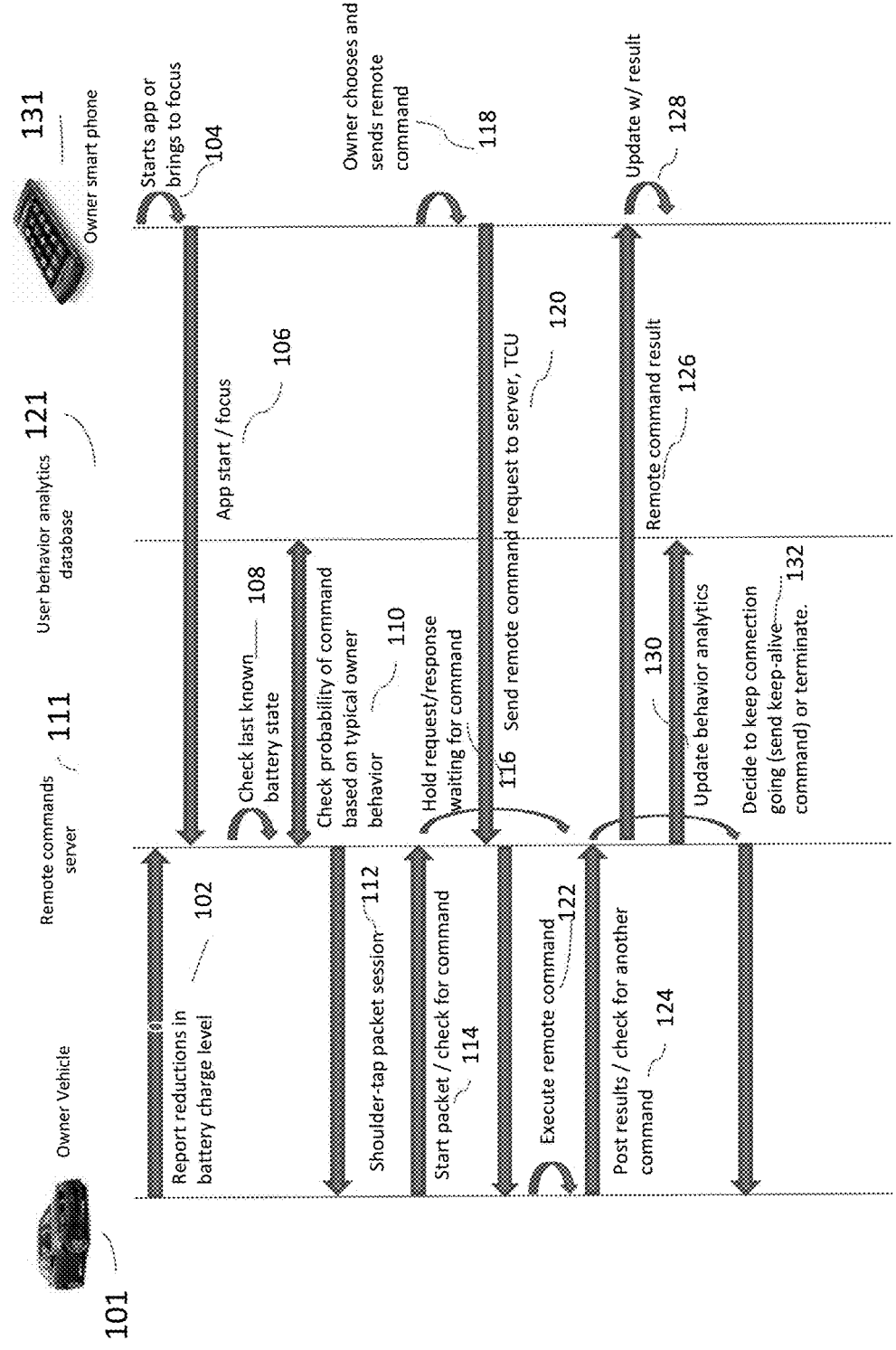
FIG. 1 illustrates a baseline flow diagram of a method for selecting an approach for establishing communications with a target device to enable execution of commands from a user with possible consideration of either or both of the power profile of a target device and the historical behavior of at least one user.

The present invention relates generally to wireless services and more particularly to devices enabled for connectivity to cellular or other wireless service and optimization for execution of user commands in relation to power management of such devices.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to an application for devices enabled for connectivity to cellular or other wireless service and optimization for execution of user commands in relation to power management of such devices, in M2M domain, as used herein the term "application" is intended to be inclusive, interchangeable, and/or synonymous with other similar applications as described further below, though one will recognize that functionally different types of applications may have characteristics, functions and/or operations which may be specific to their individual capabilities and/or deployment.

Machine to machine (M2M) network communications involve technologies to communicate with other devices often of similar abilities, different from traditional cellular communication networks for instance. In basic M2M environments, a device having limited logic (such as a sensor, meter, etc.) and limited resources (such as computing power) is resident at a location to typically capture measurable event data (such as temperature, pressure, quantity, available power etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may be stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of devices having similar abilities, characteristically, for communicating with other systems and devices on the same network.

As used herein the terms device, third party system, smart phone, terminal, remote device, target device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Many devices may be controlled or operated through instructions delivered wirelessly by remote devices. When a "target" device is in a low power state and not actively connected to communications networks to save energy or battery and reduce usage of communications resources, there is often a significant delay between the issuance of a command from the remote device and execution of the command. This delay can materially reduce user satisfaction with the experience of using the remote device to control or operate the target device, especially when the user tends to issue given instructions frequently, at regular times or in predictable circumstances, such as within a given physical proximity. The alternative of maintaining the target device in a full power state and actively connected to communications networks to optimize for rapid initiation and response to instructions issued by the user's remote device, however, could result in shortening the duration of target device battery charge or increasing its consumption of energy and use of communications resources and thus reduce user satisfaction with management of power and communications resources by target devices.

Accordingly, it is desired to provide a method and system for optimization of approaches for establishing communications between remote and target devices that balance the user's desire for rapid execution of user instructions with effective management of power and communications resources by the target devices.

It is generally known that for a remote device to issue instructions to another "target" device, a mechanism is needed to establish, actively maintain, or manage a valid wireless connection between the remote device and the other device, such as by infrared, Wi-Fi or cellular connections. Instructions issued by remote devices operating at close range, such as infrared "line of sight" devices, can be executed effectively immediately if the target device is powered on. However, remote devices capable of operating from great distances over cellular networks, such as wireless phones and other wireless devices ("remote devices"), must often initiate an active data session through public and private networks in order to communicate with and instruct the target device, such as an M2M device.

In order for a wireless communication to be received, understood and acted upon by a target device, the target device must generally be in a sufficiently powered state to operate and must have an active data session established with the wireless network. However, where the target device has been placed in a lower power mode and data sessions have been terminated to save battery, energy or use of wireless resources, delivering an instruction requested by the user may be delayed for the time necessary to deliver an initial "shoulder tap" message from the wireless network. The shoulder tap message instructs the target device to establish a data session with the wireless network in order to respond to any user command that may be communicated. If the device is in low power mode at the time the shoulder tap message is received, the target device may also be required to return to operating power level in order to establish the data session. Optimizing a target device for efficient use of power and communications resources thus frequently results in a delay. The delay can persist for many seconds between the user using a remote device operating over wireless networks to issue an instruction and the target device responding to that instruction. The delay can materially reduce user satisfaction in using the application on the remote device to control or operate the target device, especially when the user tends to issue given instructions frequently, at regular times or in predictable circumstances, such as within a given physical proximity.

There are two simple alternatives for reducing response time: 1) optimizing for rapid initiation and completion of instructions issued by the user's remote device by maintaining the target device in a full power state and keeping a data session with the wireless network continuously active, or 2) bringing the target device to that full power state and initiating a data session every time the user initiates an application on the remote device, even if the user is known from past behavior not to issue commands under the circumstances existing at the time. Each of these alternatives could result in depleting the target device battery charge or increasing its energy consumption as well as increasing consumption of communications resources. Both alternatives could result in the reduction of user satisfaction with how power and communications resources are managed by the remote instruction application.

Accordingly, what is desired is to provide a method and system for the optimization of approaches for establishing communications between remote and target devices that balance user desire for rapid execution of user instructions with effective management of the use of power and communications resources by the target devices.

Although there are many environments in which optimizing the balance between rapid execution of user commands issued from a remote device with effective management of the use of power and communications resources for a target device would be advantageous, a significant use case is the automotive industry.

Many automobiles are equipped with a target device such as a telematics control unit ("TCU") that is enabled for wireless communication, typically over cellular networks. The TCU is used for communication with the user or other parties, such as an original equipment manufacturer ("OEM") or an entity that provides telematics or other information management services and for delivery of commands to other vehicle systems (such as "turn on the lights"). Power for the TCU is provided by the vehicle's power systems. Many TCUs are programmed periodically to go to full power and initiate a data session in order to send data to the OEM or telematics service providers and to check for commands from the user or another party. Like most wireless communications devices, the control logic for the TCU typically calls for it to terminate any ongoing packet data sessions on the wireless network if no communications have been received after a specified interval and to go to a low-power state when the vehicle ignition is not on or when battery charge level is below a specified level or the vehicle is not connected to another source of continuous power, such as the utility grid. The low power/no active data session state conserves the vehicle's battery and reduces consumption of communications resources. Because the TCU must be adequately powered and a data session must be established in order to respond to a command delivered over a cellular network, there is typically a time lapse between the time the user issues a command (such as "unlock the doors") via an application on a remote device such as a smart phone and the time when a response to that command is produced by the TCU and communicated to the user.

If, when a command from the remote device is received, the TCU is in a low-power state with no active data session, which is typically the case when protocols for the vehicle prioritize minimizing consumption of power and communications resources over rapid execution of user commands, the command cannot be acted upon until the TCU is instructed to establish an active data session, which could include returning to full power mode. The act of starting the control application on the user's remote device (or bringing the application to focus, meaning the application is already running in the background on the remote device but is brought to the foreground, such as by the user touching an icon on the screen so that the user can interact with it) generally acts as such a "shoulder tap" instruction to the TCU.

The shoulder tap is a request to the TCU to initiate a connection with the cellular network, to open a packet data session with the entity that receives the command from the remote device and delivers the command to the TCU and to check for the presence of commands. The entity that receives the commands from the remote device is usually an intermediate server but, in alternate embodiments, could include the remote device or another entity; for convenience, it is referred to as the "remote command server". The method can also contain an instruction to the remote command server to wait for a command to be issued before sending a shoulder tap and instructing the target device to establish an active data session. When a command is issued via the remote device, the TCU will be instructed by the remote command server to establish an active data session if required and to receive and respond to the command, and then to report the results of its execution of the command to the remote command server. The remote command server then reports those results to the user's remote device. The time required to complete this cycle (from issuance by the user of a command to execution of the command and then the user's receipt of confirmation that the command has been executed) can be a lengthy period (up to 30 to 40 seconds), which can result in a negative user experience. If the system has been configured so that the establishment of a data session is delayed until the user has not just started the control application on the remote device, but has actually issued a command, the interval between the issuance and execution of the command is lengthened even further.

Conversely, using device protocols that prioritize minimizing the time lapse between issuance and execution of user commands, such as by keeping the TCU in full power mode and in a continuously active data session, or by establishing active data sessions every time the user initiates an application on the remote device, can cause excessive consumption of cellular resources and of vehicle power. This can result both in a rapid discharge of battery and costs for using cellular resources, which may also result in an unsatisfactory experience for the user. Since many users only initiate the remote device applications for giving commands to target devices a small number of times each day, or often wait a considerable time between initiating the application and actually issuing a command, risking depletion of battery and using cellular resources to keep the target device powered up and in an active data session at all times, or every time the application is initiated or brought to focus, could make users dissatisfied with the application.

A system and method in accordance with the present invention solves the problem of having to choose between prioritizing rapid execution of commands through keeping a target device powered up and in active communication mode, which can result in rapid battery discharge and excessive consumption of communications resources, and prioritizing minimizing the use of those power and communications resources, which can result in an excessive time lapse from the time a user issues a command to a target device to the time the command is acted upon and report of successful execution is delivered to the user. The problem is solved by the application of a set of rules executed through algorithms on the remote command server, remote device or other entity to determine the optimal manner in which to initiate a packet data session.

One embodiment of the present invention includes a method for using consideration of the power profile of the target device to evaluate and apply rules for selecting, from a plurality of possible approaches, an optimal approach for instructing a target device to establish communications in a specific situation. The power profile of the target device shows power resources available to the target device such as but not limited to level of stored power, such as battery charge, ignition status, connection to utility power, etc.

For example, if it is determined at the time a user first starts the relevant control application using a remote device that the target device has an acceptable power profile (e.g., ignition is on, the vehicle is connected to utility power or battery is not discharged below threshold of X %), then the TCU can be instructed, as part of the initial shoulder tap communication, to establish a packet data session with the remote device or server immediately to enable it to respond to any user commands, since there are ample power resources available for the TCU. In an embodiment, establishing a packet data session to enable receipt of user commands may also comprise powering up the target device, such as a TCU.

In the case where it is determined, at the time a user first starts the relevant control application using a remote device, that the target device is in a less desirable power profile (e.g., ignition is off or ignition status is not known or the vehicle is not connected to utility power or connection status is not known and the battery is discharged below a minimum level of Y %), the TCU can be instructed, as part of the initial shoulder tap communication, to wait to establish a packet data session until the user has issued an actual command. In the first case, the time required to execute user commands is minimized, and in the second, the risk of depleting the battery is avoided, thereby improving the user's overall experience. In an embodiment, establishing a packet data session to enable receipt of user commands may also comprise powering up the target device, such as a TCU.

One embodiment of the present invention includes a method for using considerations of user behavior analytics in addition to information about the power profile of the target device to evaluate and apply rules for selecting, from a plurality of possible approaches, an optimal approach for instructing a target device to establish communications in a specific situation.

"User behavior analytics" can be used to predict the likelihood that a user of a particular remote device will issue a particular command to the target device at that particular time or within a given physical proximity. User behavior analytics comprises the analysis of data gathered by an application that monitors behavior of one or more users of a particular remote device to predict the probability of likely user behavior. Data is gathered, for example, about which commands are issued by users of that particular remote device at that particular time of day, on that particular day of the week, at that particular location, or within that particular physical proximity of the target device, in relation to behavior of the user of that remote device in actually issuing that particular command in those circumstances. This determination of the probability that a command will be issued in given circumstances can then be used in combination with information about the power profile of the target device, such as a vehicle, by application of rules or an algorithm to decide how and when an active packet data session should be established.

For example, in the case where it is determined, at the time a user first starts the relevant control application using a remote device, that the target device has an intermediate power profile (e.g., ignition is off or ignition status is not known, or the vehicle is not connected to utility power or connection status is not known and the battery charge level of the vehicle is greater than Y % but less than X %), the method can direct that probability that a given command will be issued, based on analysis of historical behavior of users, be considered in determining the appropriate method for establishing a data session. For example, the remote device or intermediate server can use an algorithm such as: "if true that ignition is off (or ignition status is not known), the vehicle is not connected to utility power or connection status is not known and battery charge level of the vehicle is greater than Y % but less than X % and probability of command from that user (or remote device) is greater than or equal to N, then establish a packet data session immediately upon notification of start-up of application; otherwise, if probability of command from that user (or remote device) is less than N, wait to establish data session until notified that command is actually issued by the user". In an embodiment, establishing a packet data session to initiate communication may also comprise powering up the target device, such as a TCU.

In an embodiment, an appropriate approach can be selected as follows. 1) The method can specify an approach that optimizes for rapid execution of user commands by establishing a packet data session immediately upon notification of start-up of the control application on the remote device when the target device is powered up (e.g., vehicle ignition is on or vehicle is connected to utility power) or when the battery is fully charged (or greater than or equal to charge X %). In this situation, user behavior analytics regarding the probability that the user will promptly issue a command from the remote device will not be considered. In an alternate embodiment, the user behavior analytics can be used to proactively establish a packet data session when ignition is off or ignition status is not known, vehicle is not connected to utility power or connection status is not known and the charge level is greater than X %. 2) The method can specify another approach to be used when the target device is not known to be powered up (e.g., the vehicle ignition is off or ignition status is not known or the vehicle is not connected to utility power or connection status is not known) and the battery is partially discharged but not below a minimum acceptable threshold (e.g., charge level is less than X % but greater than Y %). In this situation, the method specifies use of an approach that achieves a better balance between rapid execution of user commands and effective management of use of power and communications resources by establishing a packet data session immediately upon notification of start-up of the control application on the remote device only when user behavior analytics indicate that the probability that the user will promptly issue a command from the remote device is greater than or equal to N. 3) The method can specify yet another approach to be used when vehicle ignition is off or ignition status is not known, vehicle is not connected to utility power or connection status is not known and battery power is below a certain minimum acceptable threshold charge (e.g., charge level is less than or equal to Y %). This approach optimizes for conserving power by only instructing the target device to establish a packet data session when the user actually issues a command; user behavior analytics regarding the probability that the user will promptly issue a command from the remote device will not be considered. In an embodiment, establishing a packet data session to initiate communication may also comprise powering up the target device, for example a TCU.

In an embodiment, the method and system determines if the power profile of a device matches one of the predetermined profiles and uses the identified power profile as a criterion for whether to consider historical behavior of the user of that device before establishing a connection for communication such as sending and receiving data, for example, user commands. The predetermined profile can be defined for the application, for example in case of a vehicle, in an embodiment, Profile 1: when the power profile of the device suggests that ignition is on or the vehicle is connected to utility power, or battery charge level is above X %. Profile 2: when the power profile of the device suggests that battery charge level is below or equal to X % but above Y %. Profile 3: when the power profile of the device suggests that battery charge level is below or equal to Y %. Since these profiles are defined for the application, the developer can set them as needed.

Similarly, for probability N that the user will promptly issue a command from the remote device is defined for the application and the developer can set it as desired. For example, it may be set as "establish a packet data session immediately upon notification of start-up of the control application on the remote device only when user behavior analytics indicate that the probability that the user will promptly issue a command from the remote device is greater than or equal to N" or simply "greater than N".

To describe the features of the present invention in more detail within the context of the automotive industry, refer to the accompanying figures in conjunction with the following discussions. These examples are used for purpose of illustration only, and should not be construed as limitations.

FIG. 1 illustrates a baseline flow diagram of a system permitting a vehicle user to issue commands to the vehicle from a remote device and using a method for selection of an approach for establishing a data session through rules based on consideration of criteria comprising power profile of the vehicle and analysis of user behavior data in order to balance effective management of use of power and communications resources with rapid execution of user commands. In an embodiment, control logic in a vehicle TCU 101 may instruct it to initiate a data session in order to report to the remote command server for receiving data and executing remote commands 111 via step 106 the power profile of the vehicle either periodically or whenever it changes, such as through change in the ignition status or connection to utility power or whenever its battery charge level has decreased to specified thresholds, such as less than X %). Periodic receipt and storage of the power profile enables the remote command server rapidly to determine the most recent vehicle power profile. A vehicle owner or user uses a smartphone or other remote device 131 to start or bring to focus an application operating on the remote device for issuing commands to the vehicle TCU via step 104. When the application is started or brought to focus, the remote device 131 sends a signal via step 106 to the remote command server 111. The remote command server 111 checks the most recent power profile of the vehicle via step 108.

Depending on the power profile of the vehicle, the remote command server 111 may query an analytics database 121 for the typical behavior of the user using user behavior analytics via step 110. In an embodiment, the typical user behavior can be represented as a probability of a command being issued by that user or remote device in a particular situation. Depending on the probability value received from the analytics database 121, the remote command server 111 sends an instruction to the vehicle TCU 101 by a shoulder-tap to establish a packet data session via step 112. The vehicle TCU 101 starts the packet data session and queries the remote command server 111 for the presence of a user command via step 114. The remote command server 111 holds the query from the vehicle TCU 101 via step 116. If and when the owner or user chooses a command via step 118, the remote command request is sent from the owner smartphone or other remote device 131 to the remote command server 111 and relayed by the remote command server to the vehicle TCU 101 via step 120.

The user command request is then executed by the vehicle TCU 101 via step 122. The results of execution are posted to the remote command server 111 and the presence of another user command is checked by the vehicle TCU 101 via step 124. The results of execution of the command are sent to the owner or user smartphone or other remote device 131 by the remote command server 111 via step 126 and the remote device is updated with the results via step 128. The user behavior analytics database is updated via step 130. A decision is made, based on the power profile of the vehicle and behavior of the user in sending command requests, about whether to keep the connection between the vehicle TCU and the remote command server active; depending on the decision made, either a "keep-alive" command or an instruction to terminate the data session and return to low-power mode is sent by the remote command server 111 to the vehicle TCU 101 via step 132.

In an embodiment, the target device can report on its power profile by periodically reporting on its then-current battery charge level. In yet another embodiment, the power profile can be reported when it changes from one threshold to another, irrespective of pre-set reporting intervals. For example, as the battery charge drops down from Y+1% to Y % or Y % to Y−1% it is reported even if it is not scheduled for reporting. Similarly, when ignition status changes from ignition "off" to ignition "on", or status of connection to utility power changes from "not connected" to "connected", it is reported even if it is not scheduled for reporting.

In an embodiment, the analytics database 121 is enabled to assign a probability that an owner or user will issue a command in specific circumstances by gathering and analyzing data regarding user behavior. For example, if the user typically unlocks the vehicle's door using an application on a smartphone or other remote device between 8:00 and 8:15 a.m. every weekday at a time when the remote device is within X meters of the vehicle, or the user typically uses the remote device application to start the vehicle air conditioning between 5:30 and 6:00 p.m. every weekday, then the analytics database will log this data. The next time that the remote device application is started or brought to focus, the analytics database 121 will calculate a probability that a command will be issued and provide that probability value on request to the remote command server 111 based on such factors as time of day and proximity of the remote device to the vehicle.

For example, the probability value will be higher when the time is closer to 8:00 a.m. or 5:00 p.m. on a weekday and when the remote device is within X meters of the vehicle, and if the remote command server 111, based on the power profile of the vehicle, is to take a probability value into account and the value assigned by the analytics database 121 is greater than N, the remote command server will instruct the vehicle TCU 101 first to establish a packet data session immediately without waiting for a user command and then to keep the connection active for a given period to allow for rapid execution of additional commands, resulting in a material reduction in time delay between issuance by the user of commands and the response to those commands and improved user satisfaction with the vehicle and the remote device control application.

Figure 2:
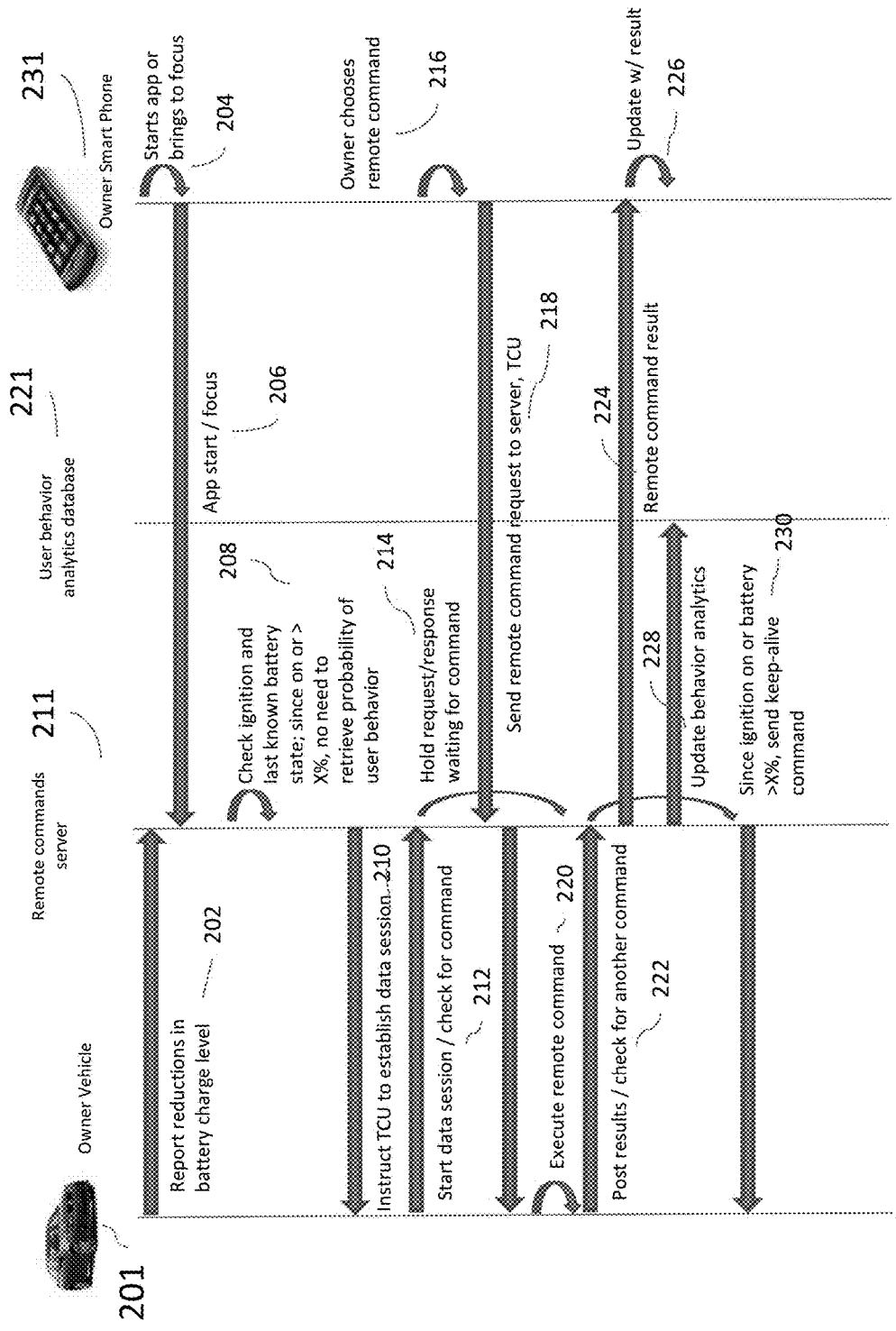
FIG. 2 illustrates optimization of a method for selecting an approach for establishing communications with a target device for rapid execution of user commands when the target device is powered on or when the charge level of the battery of the target device is greater than X % by considering only the power profile of a target device without any consideration of the historical behavior of at least one user.

FIG. 2 illustrates an embodiment of the present invention for a method for selecting an approach for establishing an active data session to optimize for rapid execution of user commands when vehicle ignition is on, the vehicle is connected to utility power or when battery is fully charged (or charge level is greater than charge X %). In this situation, consumption of power and communications resources through maintaining the TCU powered up and in an active communication state to receive and act upon user commands is not as great a concern, and the remote command server can instruct the TCU to establish a packet data session immediately when the user starts or brings to focus an application on a smartphone or other remote device, eliminating delays arising out of the TCU receiving the shoulder tap and then waiting for notification that a command has actually been received before establishing the data session. In another embodiment, the method uses user behavior analytics to proactively establish a packet data session when the power profile shows that ignition is off or ignition status is not known or the vehicle is not connected to utility power or connection status is not known but that battery charge level is greater than X % based on historical user behavior based on time of the day, day of the week, location of the target device and location of the remote device containing the remote application etc.

As shown in FIG. 2, a vehicle owner (or user) starts or brings to focus the control application operating on the remote device 231 for issuing commands to the vehicle TCU 201 via step 204. When the application is started or brought to focus, the remote device 231 sends a signal to the remote command server 211 via step 206 and the remote command server 211 checks the power profile of the vehicle via step 208. Because the power profile of the vehicle is reported as ignition on or the vehicle is connected to utility power or battery charge level greater than or equal to X %, the remote command server will not query the user behavior analytics database 221 for the probability of a command and will send an instruction to the vehicle 201 to establish a packet data session immediately via step 210. Alternatively, user behavior analytics can be used to proactively establish a packet data session when the charge level is greater than or equal to X % based on typical or historical user behavior based on time of the day, day of the week, location of the target device and location of the remote device containing the remote application etc.

The vehicle TCU 201 starts the packet data session and queries the remote command server 211 for the presence of a user command via step 212. The remote command server 211 holds the query from the vehicle TCU 201 via step 214. If and when the user chooses a remote command via step 216, the remote command request is sent from the remote device 231 to the remote command server 211 and relayed by the remote command server to the vehicle TCU 201 via step 218. This user command is then executed by the vehicle TCU 201 via step 220. The results of execution are posted to the remote command server 211 and the presence of another user command is checked by the vehicle TCU 201 via step 222. The results of execution of the user command are sent to the remote device 231 by the remote command server 211 via step 224 and the remote device is updated with the results via step 226. The user behavior analytics database is updated via step 228. Since the power profile of the vehicle is ignition on or the vehicle is connected to utility power or battery charge level greater than or equal to X %, the remote command server 211 will instruct the vehicle TCU 201 to keep the connection between the vehicle TCU and the remote command server active for a given period so that further user commands can be executed immediately.

In an alternate embodiment, the remote command server 211 uses user behavior analytics to instruct the vehicle TCU to maintain the connection between the vehicle TCU and the remote command server for a given period based on the typical user behavior as determined by user behavior analytics database when the power profile is ignition is on, the vehicle is connected to utility power or the battery charge level is greater than or equal to X %. The connection between the vehicle TCU and the remote command server is kept active without regard to user behavior analytics when the ignition is on or the vehicle is connected to utility power since in this state the battery is continuously charging or the charge level is high and such connection would not result in depletion of power resources.

Figure 3:
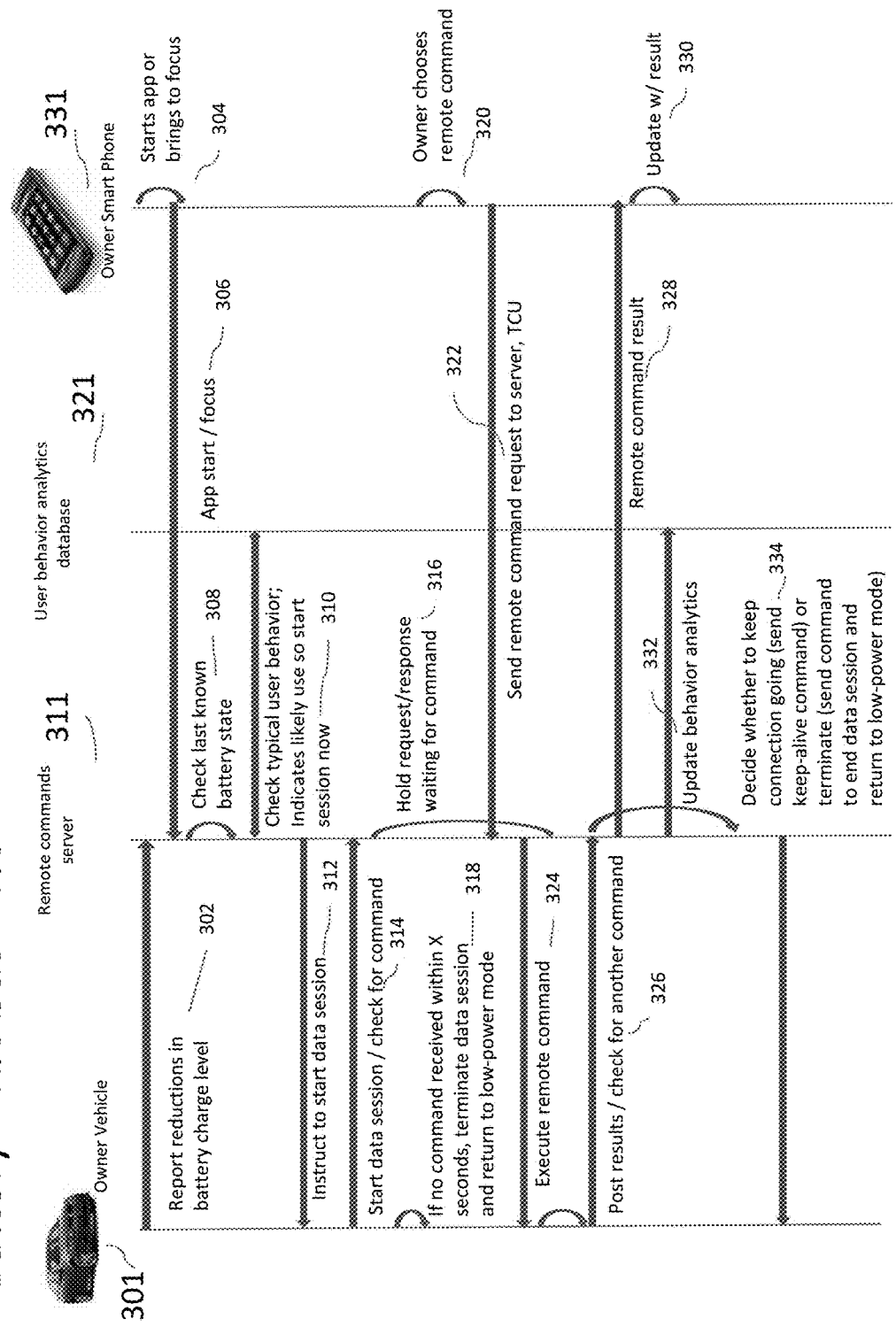
FIG. 3 illustrates adjusting a method for selecting an approach for establishing communications with a target device to achieve an optimal balance between rapid execution of user commands and power management when the target device is not powered on and when the charge level of the battery of the target device is less than X % but greater than Y % by consideration of both power profile of a target device and historical behavior of at least one user.

FIG. 3 illustrates a method for selecting an approach for establishing an active data session when the last known vehicle power profile is vehicle ignition off (or ignition status is not known), the vehicle is not connected to utility power (or connection status is not known) and the battery is partially discharged and below a certain threshold. As battery power goes down to charge less than X % but greater than or equal to Y %, the method will adjust the instructions for establishing packet data sessions by taking into account typical user behavior profile. If, based on user behavior analytics, the probability that the user will issue a command when the application has been started or brought to focus on the remote device is greater than or equal to N, the remote command server can instruct the TCU to establish a packet data session immediately. Any user command would be executed without any delay arising out of the TCU receiving the shoulder tap and then waiting for notification that a command has actually been received before establishing the data session. If the probability is less than N, then the method will prioritize reducing the use of power and communications resources and, when the application on the remote device has been started or brought to focus, instruct the vehicle TCU to wait for issuance of a command before establishing a packet data session.

As shown in FIG. 3, a vehicle owner (or user) starts or brings to focus an application operating on the remote device 331 for issuing commands to the vehicle TCU via step 304. When the application is started or brought to focus, the remote device 331 sends a signal to the remote command server 311 via step 306 and the remote command server 311 checks the power profile of the vehicle via step 308. Because the power profile of the vehicle is reported as ignition off (or ignition status not known), the vehicle is not connected to utility power (or connection status is not known) and battery charge level less than X % but greater than or equal to Y %, then the remote command server 311 queries the analytics database 321 for the probability of a command via step 310. If the probability value received is less than N, then the remote command server 311 will wait for issuance of an actual command before instructing the vehicle TCU to establish a packet data session. But if the probability value received from the analytics database 321 is greater than or equal to N, the remote command server 311 will send an instruction to the vehicle TCU 301 to establish a packet data session immediately via step 312. The vehicle TCU 301 starts the packet data session and queries the remote command server 311 for the presence of a user command via step 314.

The remote command server 311 holds the query from the vehicle TCU 301 via step 316. If a command is not received within X seconds, the remote command server 311 will instruct the vehicle TCU 301 to terminate the data session and return to low-power mode via step 316 and the process will return to initial state. If, however, the user chooses a command within that period via step 320, the command request is sent from the smartphone or other remote device 331 to the remote command server 311 and relayed by the remote command server 311 to the vehicle TCU 301 via step 322. This user command is then executed by the vehicle TCU 301 via step 324. The results of execution are posted to the remote command server 311 and the presence of another user command is checked by the vehicle TCU 301 via step 326. The results of execution of the command are sent to the remote device 331 by the remote command server 311 via step 328 and the remote device is updated with the results via step 330. The user behavior analytics database is updated via step 332.

A decision is then made, based on the power profile of the vehicle and user behavior in sending command requests, about whether to keep the connection between the vehicle TCU 301 and the remote command server 311 active; depending on the decision made, either a "keep-alive" command or an instruction to terminate the connection and return to low-power mode is sent by the remote command server 311 to the vehicle TCU 301 via step 334.

Figure 4:
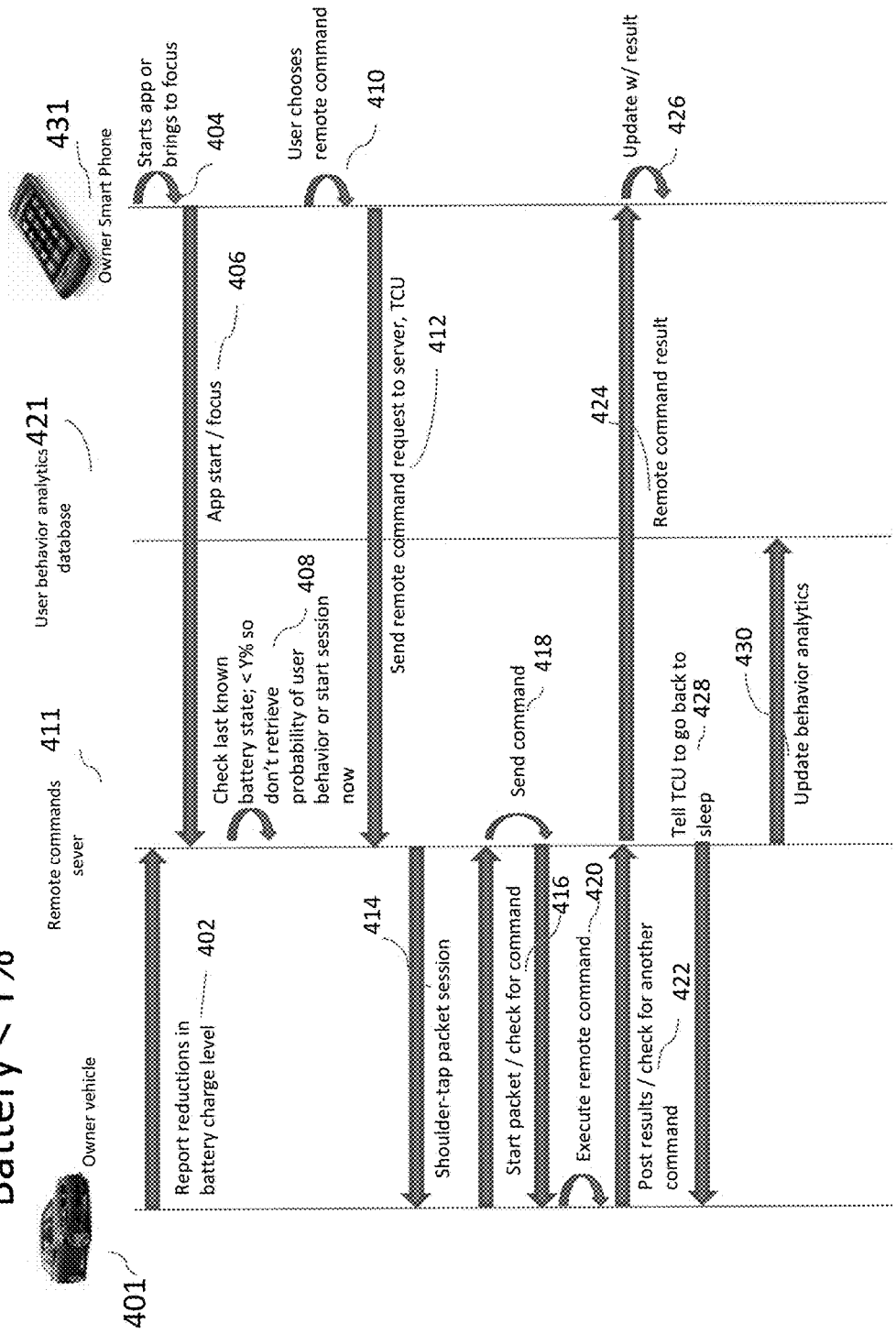
FIG. 4 illustrates adjusting a method for selecting an optimal approach for establishing communications with a target device to adjust protocol for execution of user commands in order to optimize power management when the target device is not powered on and the charge level of the battery of the target device is less than Y % by considering only the power profile of a target device without any consideration of the historical behavior of at least one user.

FIG. 4 illustrates a method for selecting an approach for establishing an active data session as battery power is reduced below a certain threshold charge. For example, if ignition is off (or ignition status is not known), the vehicle is not connected to utility power (or connection status is not known) and the charge is less than Y %, consumption of power and communications resources through maintaining the TCU in an active power and communication state to receive and act upon user commands is a concern, and accordingly the remote command server will wait to instruct the TCU to establish a packet data session only when a command is actually issued by the user without any consideration to typical user behavior. Once a command is issued and executed, the TCU will be kept in full power mode and the data session will be kept connected for a very short period of time waiting for additional commands. While there will be a resulting delay in execution of user commands as the TCU is not connected to the remote command server until a user command has actually been received and the instruction to establishment a data session has been sent to the TCU, the user would possibly be even less satisfied if optimizing for rapid execution of commands resulted in the battery being discharged below the level needed for ignition.

As shown in FIG. 4, a vehicle owner (or user) starts or brings to focus an application operating on the remote device 431 for issuing commands to the vehicle TCU 401 via step 404. When the application is started or brought to focus, the remote device 431 sends a signal to the remote command server 411 via step 406 and the remote command server 411 checks the last known power profile of the vehicle stored in the remote command server via step 408. Because the power profile of the vehicle is reported as battery charge level less than Y % and ignition status is either not known or is off and the vehicle is either not connected to utility power or connection status is not known, the remote command server will not query the analytics database 421 for the probability of a command and will wait to send a shoulder-tap to the vehicle TCU 401 until the user actually chooses a command. Once the user chooses a command, the remote command request is sent from the smartphone or other remote device 431 to the remote command server 411 via step 414.

The remote command server 411 sends a shoulder-tap to the vehicle TCU 401 instructing it to establish a packet data session via step 414. The vehicle TCU 401 starts the packet data session and queries the remote command server for the presence of a user command via step 416; the remote command server relays the command to the vehicle TCU via step 418. This user command is then executed by the vehicle TCU 401 via step 420. The results of execution are posted to the remote command server 411 and the presence of another user command is checked by the vehicle TCU 401 via step 422. The results of execution of the remote command are sent to the remote device 431 by the remote command server 411 via step 424 and the remote device is updated with the results via step 426. Since the power profile of the vehicle is battery charge level less than Y %, the remote command server 411 will not wait for an additional user command, but will instead immediately instruct the vehicle TCU 401 to terminate the packet data session and connection between the vehicle TCU and the remote command server and to return to low-power mode in order to conserve battery and communications resources via step 428. The user behavior analytics database is updated via step 430.

Figure 5:
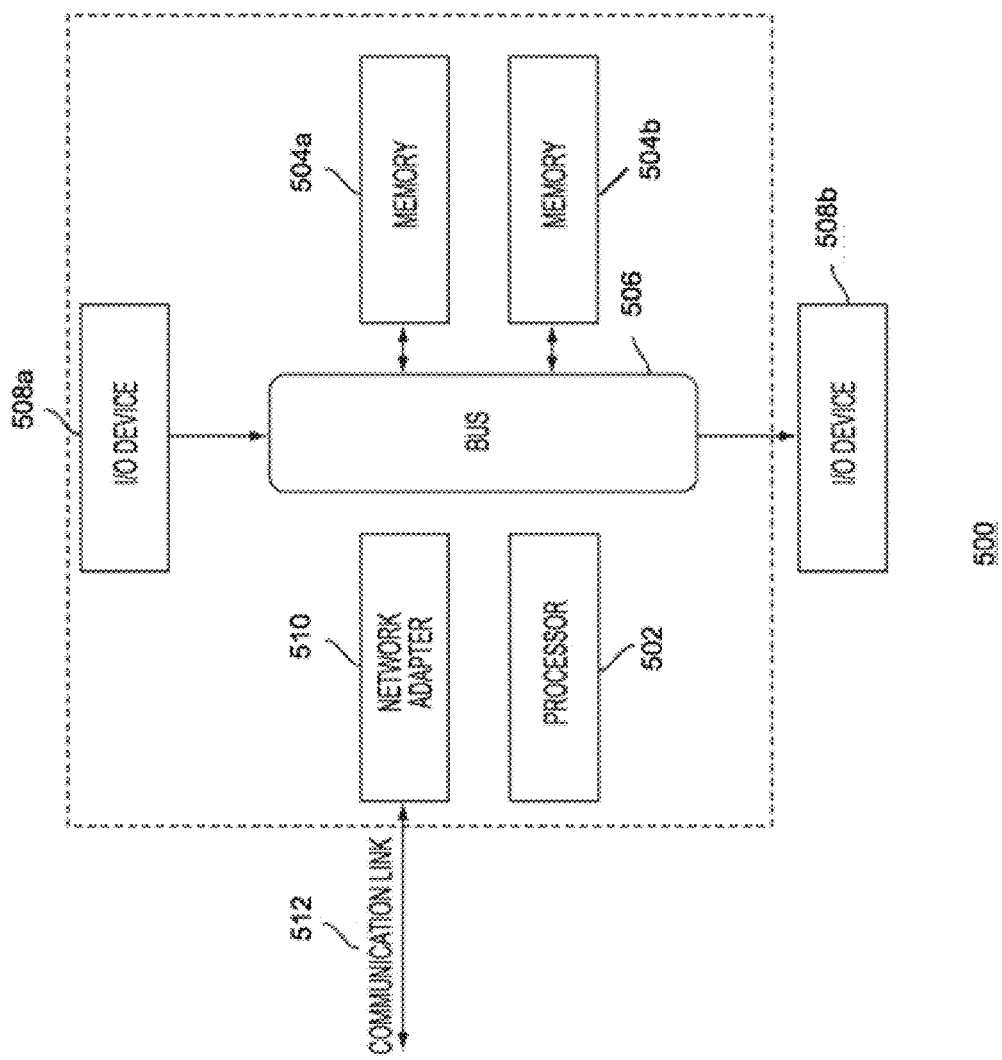
FIG. 5 illustrates a data processing system 500 suitable for storing the computer program product and/or executing program code relating to the choices of the users in accordance with an embodiment of the present invention.

A further embodiment of the present invention that includes a computer program product system having a method for selecting one or more approaches to establishing a data connection that optimize the balance between rapid execution of user commands and effective management of use of power and communications resources depending on situational characteristics, including but not limited to, power profile of the device and user behavior analytics, is provided in accordance with the present invention. FIG. 5 illustrates a data processing system 500 suitable for storing the computer program product and/or executing program code in accordance with an embodiment of the present invention. The data processing system 500 includes a processor 502 coupled to memory elements 504*a-b* through a system bus 506. In other embodiments, the data processing system 500 may include more than one processor and each processor may be coupled directly or indirectly to one or more memory elements through a system bus.

Memory elements 504*a-b* can include local memory employed during actual execution of the program code, bulk storage, and cache memories that provide temporary storage of at least some program code in order to reduce the number of times the code must be retrieved from bulk storage during execution. As shown, input/output or I/O devices 508*a-b* (including, but not limited to, keyboards, displays, pointing devices, etc.) are coupled to the data processing system 500. I/O devices 508*a-b* may be coupled to the data processing system 500 directly or indirectly through intervening I/O controllers (not shown).

In FIG. 5, a network adapter 510 is coupled to the data processing system 902 to enable data processing system 502 to become coupled to other data processing systems or remote printers or storage devices through communication link 512. Communication link 512 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-RAN).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms device, target device, appliance, terminal, remote device, computer, server, wireless asset, smartphone, remote device, etc. are intended to be inclusive, interchangeable, and/or synonymous with one another and other similar communication-based or computing equipment for purposes of the present invention though one will recognize that functionally each may have unique characteristics, functions and/or operations which may be specific to its individual capabilities and/or deployment.

Similarly, it is envisioned by the present invention that the term "communications", "wireless' or "cellular" network includes communications across a network (such as that of a network for M2M communication but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, wireless local area network (WLAN), and one or more wired networks.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application or similar while the primary software and data are stored on servers or locations apart from the devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for optimizing user experience in relation to power management of a device comprising:
    determining a power profile of the device, wherein the power profile of the device includes information of power resources available to power the device;
    determining historical behavior of at least one user; and
    using a criterion based on the power profile of the device for checking the historical behavior of the at least one user; wherein:
        if the determined power profile of the device is a first predetermined power profile, power management of the device is performed to cause the device to establish a connection for receiving commands when the at least one user initiates a remote application to issue a command to the device but before the command is issued;
        if the determined power profile of the device is a second predetermined power profile, power management of the device is performed to cause the device to establish a connection for receiving commands based on the historical behavior of the at least one user; and
        if the determined power profile of the device is a third predetermined power profile, power management of the device is performed to cause the device to establish a connection for receiving commands only when the at least one user issues a command.

2. The method of claim 1 wherein determining historical behavior of at least one user further comprises:
    determining a probability that the at least one user will engage in a behavior based on historical behavior of the at least one user with respect to a set of parameters related to the device.

3. The method of claim 2 wherein the set of parameters related to the device comprise any of: location of the device, location of a remote device containing the remote application, time of the day, day of the week, a type of command issued and a combination thereof, when the at least one user issues a command.

4. The method of claim 1 wherein the first predetermined power profile further comprises:
    determining that the power profile of the device is any of: stored power level equal to or above a first predetermined percentage and the device receiving a continuous supply of power through a power supply.

5. The method of claim 4 wherein the second predetermined power profile further comprises:
    determining that the power profile of the device is stored power level equal to or above a second predetermined percentage and below the first predetermined percentage.

6. The method of claim 5 wherein the third predetermined power profile further comprises:
    determining that the power profile of the device is stored power level below the second predetermined percentage.

7. The method of claim 1 wherein the device establishes a connection for receiving commands further comprises powering up of the device.

8. A computer-implemented method for optimizing user experience in relation to power management of a device comprising:
    determining a power profile of the device, wherein the power profile of the device includes information of power resources available to power the device;
    determining historical behavior of at least one user; and
    using a criterion based on the power profile of the device for checking the historical behavior of the at least one user; wherein:
        if the determined power profile is a first predetermined power profile, power management of the device is performed to cause the device to establish a connection for receiving commands based on the historical behavior of the at least one user;
if the determined power profile is a second predetermined power profile, power management of the device is performed to cause the device to establishes a connection for receiving commands based on the historical behavior of the at least one user; and
if the determined power profile of the device is a third predetermined power profile, power management of the device is performed to cause the device to establish a connection for receiving commands only when the at least one user issues a command.

9. The method of claim 8 wherein determining historical behavior of at least one user further comprises:
determining a probability that the at least one user will engage in a behavior based on historical behavior of the at least one user with respect to a set of parameters related to the device.

10. The method of claim 8 wherein the set of parameters related to the device comprise any of: location of the device, location of a remote device containing the remote application, time of the day, day of the week, a type of command issued and a combination thereof, when the at least one user issues a command.

11. The method of claim 8 wherein the first predetermined power profile further comprises:
determining that the power profile of the device is any of: stored power equal to or above a first predetermined percentage and the device receiving a continuous supply of power through a power supply.

12. The method of claim 11 wherein the second predetermined power profile further comprises:
determining that the power profile of the device is stored power equal to or above a second predetermined percentage and below the first predetermined percentage.

13. The method of claim 12 wherein the third predetermined power profile further comprises:
determining that the power profile of the device is stored power below the second predetermined percentage.

14. The method of claim 8 wherein the device establishes a connection for receiving commands further comprises powering up of the device.

15. A system for optimizing user experience in relation to power management of a device comprising:
a processor, and
a memory in communication with the processor wherein the memory containing program instructions which when executed by the processor, perform the following operations comprising:
determining a power profile of the device, wherein the power profile of the device includes information of power resources available to power the device;
determining historical behavior of at least one user and using a criterion based on the power profile of the device for checking historical behavior of at least one user; such that:
if the determined power profile is a first predetermined power profile, power management of the device is performed to cause the device to establish a connection for receiving commands when the at least one user initiates a remote application to issue a command to the device but before the command is issued;
if the determined power profile is a second predetermined power profile, power management of the device is performed to cause the device to establish a connection for receiving commands based on the historical behavior of at least one user; and
if the determined power profile of the device is a third predetermined power profile, power management of the device is performed to cause the device to establish a connection for receiving commands only when the at least one user issues a command.

16. The system of claim 15 wherein determining historical behavior of at least one user further comprises:
determining a probability that the at least one user will engage in a behavior based on a historical behavior of the at least one user with respect to a set of parameters related to the device.

17. The system of claim 16 wherein the set of parameters related to the device comprise any of: location of the device, location of a remote device containing the remote application, time of the day, day of the week, a type of command issued and a combination thereof, when the at least one user issues a command.

18. The system of claim 15 wherein the first predetermined power profile further comprises:
determining that the power profile of the device is any of: stored power level equal to or above a first predetermined percentage and the device receiving a continuous supply of power through a power supply.

19. The system of claim 18 wherein the second predetermined power profile further comprises:
determining that the power profile of the device is stored power level equal to or above a second predetermined percentage and below the first predetermined percentage.

20. The system of claim 19 wherein the third predetermined power profile further comprises:
determining that the power profile of the device stored power level is below the second predetermined percentage.

21. The system of claim 15 wherein the device establishes a connection for receiving commands further comprises powering up of the device.

22. A computer-implemented method for optimizing user experience in relation to power management of a device comprising:
determining a power profile of the device as at least one user invokes a remote application used to issue commands to the device, wherein the power profile of the device includes information of power resources available to power the device;
determining historical behavior of at least one user based on a set of parameters related to the device;
using rules for selecting at least one of a plurality of approaches for establishing communications with the device based on power management of the device, wherein the rules for selecting at least one of plurality of approaches comprises considering any of power profile of the device, historical behavioral data of the at least one user and a combination thereof; and
selecting at least one of the plurality of approaches for establishing communications with the device in relation to a result of the considering.

23. The method of claim 22, wherein determining the historical behavior of at least one user based on a set of parameters related to the device, wherein the set of parameters comprises any of: location of the device, location of a remote device containing the remote application, time of the day, day of the week, a type of command issued and a combination thereof, when the at least one user issues a command.

24. A system for optimizing user experience in relation to power management of a device comprising:
- a processor, and
- a memory in communication with the processor wherein the memory contains program instructions which, when executed by the processor, perform the following operations comprising:
  - determining a power profile of the device as at least one user invokes a remote application used to issue commands to the device, wherein the power profile of the device includes power resources available to the device;
  - determining historical behavior of at least one user based on a set of parameters related to the device;
  - using rules for selecting at least one of a plurality of approaches for establishing communications with the device based on power management of the device,
    - wherein the rules for selecting at least one of plurality of approaches comprises considering any of power profile of the device, historical behavioral data of the at least one user and a combination thereof; and
  - selecting at least one of the plurality of approaches for establishing communications with the device in relation to a result of the considering.

25. The system of claim 24, wherein determining the historical behavior of at least one user based on a set of parameters related to the device further comprises: gathering user behavior data based on a set of parameters, wherein the set of parameters comprise any of: location of the device, location of a remote device containing the remote application, time of the day, day of the week, a type of command issued and a combination thereof, when the at least one user issues a command.

26. A computer program product for optimizing user experience in relation to power management of a device stored on a non-transitory computer usable medium, comprising computer readable programming for causing a computer to control execution of an application for optimizing user experience and power management comprising:
  - determining a power profile of the device as at least one user invokes a remote application used to issue commands to the device, wherein the power profile of the device includes power resources available to the device;
  - determining historical behavior of at least one user based on a set of parameters related to the device;
  - using rules for selecting at least one of a plurality of approaches for establishing communications with the device based on power management of the device,
    - wherein the rules for selecting at least one of plurality of approaches for the device comprises considering any of the power profile of the device, the historical behavioral data of the at least one user and a combination thereof; and
  - selecting at least one of the plurality of approaches for establishing communications with the device in relation to a result of the considering.

27. The computer program product of claim 26, wherein determining historical behavior of at least one user based on a set of parameters related to the device further comprises: gathering user behavior data, wherein the set of parameters comprise any of: location of the device, location of a remote device containing the remote application, time of the day, day of the week, a type of command issued and a combination thereof, when the at least one user issues a command.

28. A computer-implemented method for optimizing user experience in relation to power management of a device comprising:
  - determining a power profile of the device as at least one user invokes a remote application used to issue commands to the device, wherein the power profile of the device includes power resources available to the device; and
  - using the power profile as a criterion for selecting at least one of a plurality of approaches for establishing communications with the device, such that
    - if the determined power profile of the device is a first predetermined power profile, power management of the device is performed to cause the device establish a connection for receiving commands when the at least one user initiates a remote application to issue a command to the device but before the command is issued; and
    - if the determined power profile of the device is a second predetermined power profile, power management of the device is performed to cause the device establish a connection for receiving commands only when the at least one user issues a command.

* * * * *